United States Patent [19]

Stagner

[11] 3,718,792
[45] Feb. 27, 1973

[54] OVERLOAD INDICATOR

[76] Inventor: Jack R. Stagner, 13708 Shaver, La Puente, Calif. 91746

[22] Filed: May 12, 1972

[21] Appl. No.: 252,556

[52] U.S. Cl. .............................. 200/85 R, 340/52 R
[51] Int. Cl. ............................................ H01h 3/14
[58] Field of Search ..... 200/85, 61.44; 340/52 R, 272

[56] References Cited

UNITED STATES PATENTS 2,769,967   11/1956   Lukocevich .......................... 340/52 R
3,531,776    9/1970   Henzel ................................ 200/85 R Primary Examiner—David Smith, Jr.
Attorney—Boniard I. Brown

[57] ABSTRACT

An overload indicator for a cargo handling vehicle, such as a truck, trailer, or the like, having a chassis mounting a cargo receiver and supported on wheel axles by springs which yield under the cargo weight with resultant lowering of the chassis toward the axles. The indicator has two separate parts to be attached to one axle and the chassis, respectively, in such a way that the chassis part lowers into contact with the axle part to actuate an overload signal upon loading of the vehicle to a predetermined cargo weight. The indicator is adjustable to vary the cargo weight at which the overload signal is actuated and is designated to avoid damage to the indicator in the event of deflection of the vehicle springs beyond the point at which the chassis part initially engages the axle part due to continued loading of the vehicle or bouncing of the vehicle chassis and axle in travel.

13 Claims, 4 Drawing Figures

PATENTED FEB 27 1973 3,718,792

OVERLOAD INDICATOR

BACKGROUND OF THE INVENTION

1. Field of the Invention

This invention relates generally to cargo hauling vehicles such as trucks, trailers and the like. The invention relates more particularly to an overload indicator for such vehicles.

2. Prior Art

A major problem in the trucking industry involves loading trucking vehicles, i.e., trucks and trailers, to the maximum allowable pay load for maximum revenue, without exceeding the legal weight limits specified by state highway codes. These legal weight limits are established to prevent damage to pavement and roadbeds, and are usually specified in terms of maximum load per wheel or axle.

To detect violation of the legal weight limits, most of the states have check stations at key points along the highways, where trucks are required to be driven onto scales so as to check the load per wheel. If a truck is found to be illegally loaded, it is detained until another truck can be dispatched to take off part of the load, and the driver is issued a citation which carries with it a substantial fine that may take the entire profit of that trip. The truck operators are therefore vitally concerned with the problem of staying within legal weight limits and will not knowingly load their trucks beyond that legal limit.

The larger trucking concerns, knowing that they cannot operate profitably if periodically penalized for illegal loading, have their own private scales, while smaller operators, usually make use of public scales. However, in many localities there are no public scales within reasonable distance of the loading area, while in other instances, loading is done at night when public scales are closed. In such situations, the operator has no alternative but to rely upon his own judgement and hope for the best.

Even the most experienced operators have found this loading by estimate a precarious proposition. A total load that would be well within the legal limit if uniformly distributed on all wheels may be illegally overloaded on one axle if improperly distributed. Shifting loads are frequently responsible for illegal overloads, even though the vehicle was within the legal limits at the time it was loaded. Thus, the problem of obtaining maximum freight revenues without exceeding legal weight limits is not a simple matter, and truck operators have frequently been put to considerable expense and inconvenience as a result of misjudgment in loading, or shifting of the load.

In order to obviate the above problems, a variety of vehicle overload indicators have been devised. These indicators are designed for installation directly on the trucking vehicles and provide an indication whether the vehicle exceeds the legal weight limits. Examples of the existing overload indicators are found in U.S. Pat. Nos. 2,761,038, 2,779,013, 2,842,633, and 2,996,697. While these overload indicators are satisfactory to some extent, they possess certain disadvantages which have prevented their widespread acceptance. Foremost, among these disadvantages are complexity, relatively high cost, and poor reliability.

SUMMARY OF THE INVENTION

The overload indicator of the present invention avoids the foregoing and other disadvantages of the existing indicators. This improved indicator has two parts equipped with mounting means for attaching the parts to the chassis and an axle of a trucking or cargo hauling vehicle in such a way that during loading of the vehicle with cargo, the chassis mounted part lowers with the vehicle chassis toward the axle mount part as the vehicle springs yield under the increasing cargo weight. One indicator part includes a switch for controlling an overload signaling device, such as a warning light or audible warning device which may be mounted in convenient location on the vehicle. The other indicator part includes a resiliently yieldable arm having one end attached to the mounting means of the latter part and its other end adapted for contact with the overload signal control switch to actuate the switch upon relative movement of the parts toward one another during vehicle loading.

The switch actuating arm is yieldably biased in the direction of the switch with a force sufficient to actuate the switch upon engagement of the arm with the switch. On the other hand yieldable bias force on the arm is sufficiently small to enable the arm to yield in the event of continued relative movement of the indicator parts toward one another following initial contact of the arm with the switch owing to additional loading of the vehicle or bouncing of the vehicle chassis and axle in travel.

Adjustable stop means are provided for adjustably limiting movement of the switch actuating arm toward the overload control switch by the yieldable bias force on the arm. This stop means may be set to condition the overload indicator for activating the overload signal at any predetermined vehicle loading which may be equal to or slightly less than the maximum permissible loading. If desired, a trucking vehicle may be provided with an overload indicator for each vehicle axle to assure that not only the total vehicle weight but also the vehicle load per axle are within the legal limits.

DESCRIPTION OF THE PREFERRED EMBODIMENT

Figure 1:
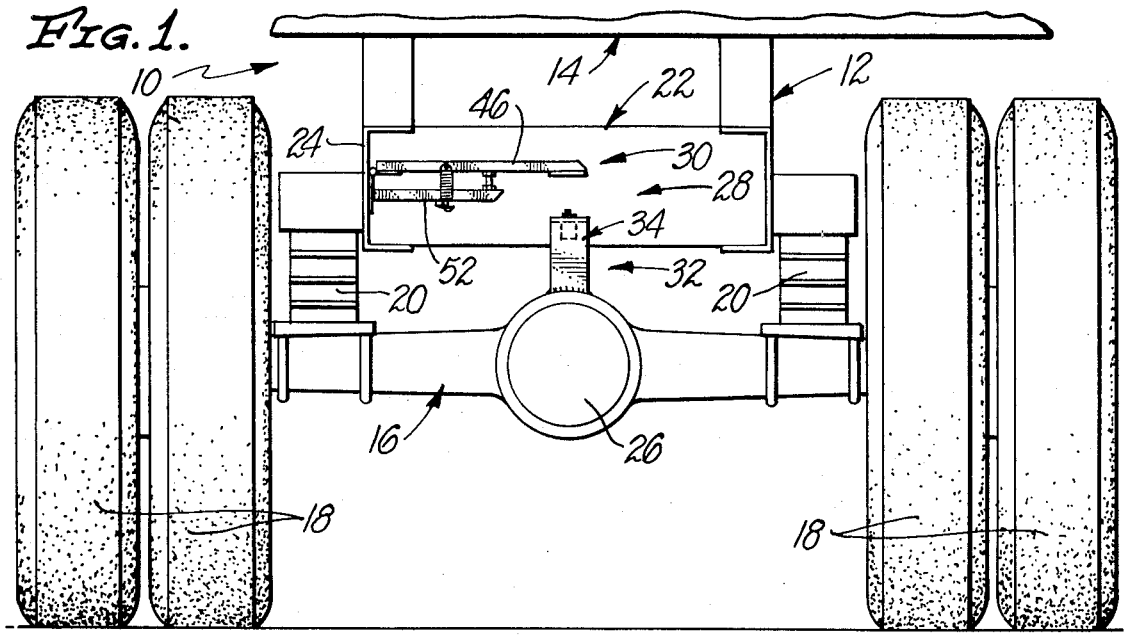
FIG. 1 illustrates an overload indicator according to the invention installed on a trucking or cargo hauling vehicle.

FIG. 1 shows a portion of the undercarriage of a conventional trucking or cargo hauling vehicle 10. Vehicle 10 has a chassis 12 mounting a cargo receiver 14, a drive axle 16 below the chassis supporting drive wheels 18, and springs 20 supporting the chassis on the ends of the axle. Chassis 12 includes a frame 22 with longitudinal frame members 24 to which the cargo receiver 14 is attached. Axle 16 has a central enlarged differential housing 26. When the cargo receiver 14 is loaded with cargo to be hauled, the springs 20 deflect with resultant lowering of the chassis 12 toward the axle 16. The downward displacement of the chassis from the normal elevated position which it occupies when the cargo receiver 14 is empty is proportional to the cargo weight.

Figure 3:
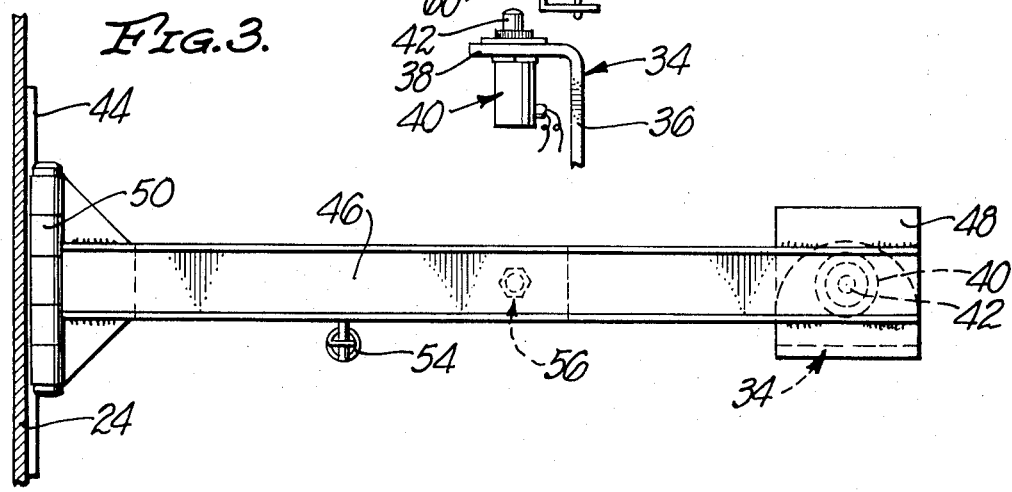
FIG. 3 is a top view of the indicator in FIG. 2.

Mounted on the vehicle 10 is an overload indicator 28 according to this invention. Indicator 28 has two parts 30 and 32 carried by the vehicle chassis 12 and axle 16, respectively. Axle mounted part 32 includes a generally inverted L-shaped mounting bracket 34 having a vertical leg 36 and a horizontal leg 38 extending from the upper end of the vertical leg. The lower end of the vertical bracket leg 36 is welded or otherwise rigidly attached to the axle differential housing 26. Fixed to the horizontal bracket leg 38 is an overload indicator control switch 40 having an upper switch actuating plunger 42. Plunger 42 is spring loaded upwardly to its normal extended position of FIG. 3. In this extended position of the plunger, the switch contacts (not shown) occupy their normal condition which, in this disclosure, is assumed to be open. Downward depression of the plunger closes the contacts to actuate an overload signaling device (not shown) electrically connected to the truck and mounted in any convenient location on the vehicle.

The chassis mounted part 30 of the overload indicator 28 includes a mounting bracket 44 in the form of a plate which is welded or otherwise firmly attached to the inner side of one chassis frame member 24, over the axle 16. Attached at one end to the bracket plate 44 and extending inwardly therefrom over and generally parallel to the axle is an arm 46. The opposite free end of the arm carries at its under side a pad 48 which is located directly over and faces downwardly toward the switch 40. In the particular inventive embodiment shown arm 46 is a hinged arm attached by a hinge 50 to the bracket plate 44. The hinging axis of the arm extends longitudinally of the vehicle so that the arm is swingable vertically toward and away from the switch 40.

Below the hinged arm 46 is a second arm 52. Arm 52 is rigidly fixed at one end to the bracket plate 44 and projects inwardly from the plate, generally parallel to the axle 16. The length of the fixed arm 52 is substantially less than that of the hinged arm 46 so that the latter arm projects inwardly a distance beyond the fixed arm, as shown.

Figure 2:
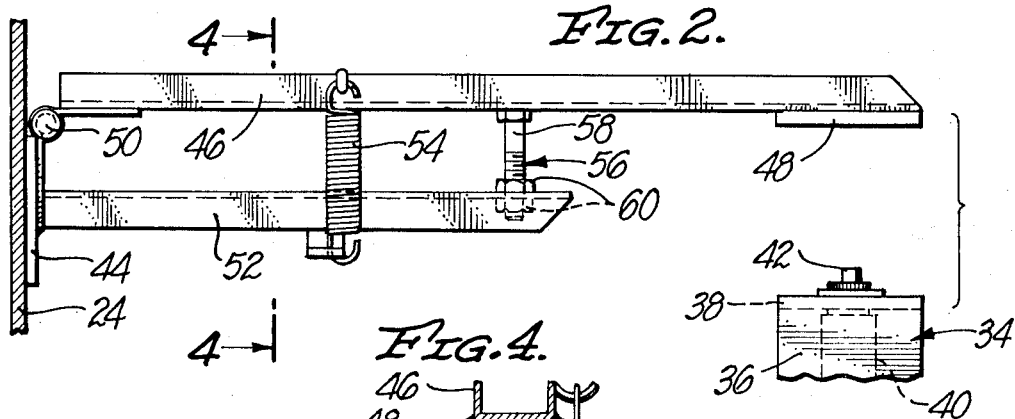
FIG. 2 is an enlarged side view of the indicator.
Figure 4:
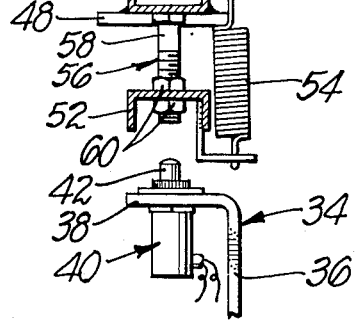
FIG. 4 is a section taken on line 4—4 in FIG. 3.

Connected between the arms 46, 52 is a spring 54 which urges the hinged arm downwardly toward the switch 40. A stop 56 limits downward movement or swinging of the hinged arm to its normal position of FIG. 2. The illustrated stop comprises a bolt 58 which extends through a hole in the free end of the fixed arm 52 and is adjustably secured to the latter arm by nuts 60. Bolt 58 projects upwardly from the fixed arm for contact by the hinged arm 46 to limit downward swinging of the arm. The bolt is adjustable up and down to adjust the limiting position of the hinged arm.

Assuming that FIG. 1 illustrates the vehicle in its unloaded condition, the overload indicator 28 is installed on the vehicle and adjusted so that the indicator parts 30, 32 are normally spaced, as shown. During loading of the vehicle, the increasing load weight causes deflection of the vehicle springs 20 with resultant lowering of the chassis 12 toward the axle 16. The upper chassis mounted indicator part 30 lowers with the chassis toward the lower axle mounted indicator part 32. At some vehicle loading, the free end of the hinged arm 46 on the upper part engages and then depresses the switch plunger 42 to actuate the overload signaling device. In this regard, it will be understood that the biasing spring 54 for the hinged arm is sufficiently strong to override the plunger spring. However, the arm spring permits upward swinging or yielding of the arm in the event the vehicle is additionally loaded after depression of the switch plunger to its limit or during bouncing of the vehicle chassis and axle in travel so as to prevent damage to the overload indicator.

The indicator arm stop 56 is set to condition the overload indicator for contact of its hinged arm with the switch plunger 42 to actuate the overload signaling device at some predetermined vehicle axle load. This predetermined axle loading may be equal to or slightly less than the maximum legal load limit. As noted earlier, each load axle of the vehicle may be provided with an overload indicator.

I claim:

1. An overload indicator for a vehicle having a chassis mounting a cargo receiver, an axle, and springs supporting said chassis on said axle, whereby loading of said receiver with cargo lowers said chassis toward said axle, said indicator comprising:

first and second indicator parts including mounting means for attaching said parts to the vehicle chassis and cargo receiver, respectively, in positions such that said first part lowers with said chassis toward said second part when said cargo receiver is loaded, all of said parts including further an overload signal control switch, and the other part including further a resiliently yieldable arm having one end attached to the mounting means of the latter part and its other end adapted for contact with said switch to actuate said switch upon relative movement of said parts toward one another under the weight of cargo in said cargo receiver, said arm being yieldably biased in the direction of said switch, whereby said arm may yield in the opposite direction upon continued relative movement of said parts toward one another following initial contact of said arm with said switch, and stop means limiting movement of said arm toward said switch.

2. An overload indicator according to claim 1 wherein:

said stop means is adjustable to adjust the limiting position to which said arm is biased in said direction.

3. An overload indicator according to claim 2 wherein:

said stop means comprises a second arm rigid on the mounting means of said other part and extending longitudinally of said yieldable arm, and an adjustable stop member carried by said second arm and engagable by said yieldable arm.

4. An overload indicator according to claim 1 wherein:

said yieldable arm comprises a rigid arm member, a hinge attaching said arm member at its one end to the mounting means of said other part for swinging of the other end of said arm member toward and away from said switch, and a spring urging said arm member toward said switch.

5. An overload indicator according to claim 4 wherein:
said stop means is adjustable to adjust the limiting position to which said arm member is biased in said direction by said spring.

6. An overload indicator according to claim 5 wherein:
said stop means comprises a second arm rigid on the mounting means of said other part and extending longitudinally of said arm member, and an adjustable stop member carried by said second arm and engagable by said arm member.

7. In combination:
a vehicle having a chassis mounting a cargo receiver, an axle, and springs supporting said chassis on said axle, whereby loading of said receiver with cargo lowers said chassis toward said axle, first and second indicator parts including mounting means attaching said parts to the vehicle chassis and cargo receiver, respectively, in positions such that said first part lowers with said chassis toward said second part when said cargo receiver is loaded,
one of said parts including further an overload signal control switch, and
the other part including further a resiliently yieldable arm having one end attached to the mounting means of the latter part and its other end adapted for contact with said switch to actuate said switch upon relative movement of said parts toward one another under the weight of cargo in said cargo receiver, said arm being yieldably biased in the direction of said switch, whereby said arm may yield in the opposite direction upon continued relative movement of said parts toward one another following initial contact of said arm with said switch, and stop means limiting movement of said arm toward said switch.

8. The combination according to claim 7 wherein:
said stop means is adjustable to adjust the limiting position to which said arm is biased in said direction.

9. The combination according to claim 8 wherein:
said stop means comprises a second arm rigid on the mounting means of said other part and extending longitudinally of said yieldable arm, and an adjustable stop member carried by said second arm and engagable said yieldable arm.

10. The combination according to claim 7 wherein:
said yieldable arm comprises a rigid arm member, a hinge attaching said arm member at its one end to the mounting means of said other part for swinging of the other end of said arm member toward and away from said switch, and a spring urging said arm member toward said switch.

11. The combination according to claim 10 wherein:
said stop means is adjustable to adjust the limiting position to which said arm member is biased in said direction by said spring.

12. The combination according to claim 11 wherein:
said stop means comprises a second arm rigid on the mounting means of said other part and extending longitudinally of said arm member, and an adjustable stop member carried by said second arm and engagable by said arm member.

13. The combination according to claim 12 wherein:
said vehicle chassis includes longitudinal frame members extending over the ends of said axle,
said first indicator part is mounted over and attached to the center of said axle,
the mounting means of said second indicator part comprises a bracket attached to one frame member over said axle, and
said arm member and second arm of said second indicator part extending from said bracket generally parallel to and toward the center of said axle with said other end of said arm member located over said switch.

* * * * *